United States Patent
Levy-Abegnoli et al.

(10) Patent No.: US 10,868,731 B2
(45) Date of Patent: Dec. 15, 2020

(54) DETECTING SEASONAL CONGESTION IN SDN NETWORK FABRICS USING MACHINE LEARNING

(71) Applicant: Cisco Technology, Inc., San Jose, CA (US)

(72) Inventors: Eric M. Levy-Abegnoli, Valbonne (FR); Jean-Philippe Vasseur, Saint Martin d'uriage (FR); Pascal Thubert, La Colle sur Loup (FR); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 0 days.

(21) Appl. No.: 16/268,796

(22) Filed: Feb. 6, 2019

(65) Prior Publication Data

US 2020/0252300 A1 Aug. 6, 2020

(51) Int. Cl.
*H04L 12/24* (2006.01)
*H04L 12/26* (2006.01)
*H04L 12/803* (2013.01)

(52) U.S. Cl.
CPC ............ *H04L 41/147* (2013.01); *H04L 43/04* (2013.01); *H04L 43/067* (2013.01); *H04L 43/0882* (2013.01); *H04L 47/125* (2013.01)

(58) Field of Classification Search
CPC ..... H04L 41/147; H04L 43/04; H04L 43/067; H04L 43/0882; H04L 47/125
See application file for complete search history.

(56) References Cited

U.S. PATENT DOCUMENTS

| | | | | |
|---|---|---|---|---|
| 2012/0163389 A1* | 6/2012 | Zhang | ..................... | H04L 45/24 370/400 |
| 2013/0286846 A1* | 10/2013 | Atlas | ...................... | H04L 45/24 370/236 |
| 2014/0059225 A1* | 2/2014 | Gasparakis | ......... | H04L 29/0818 709/226 |

(Continued)

OTHER PUBLICATIONS

Bhatele, et al., "Identifying the Culprits Behind Network Congestion", 2015 IEEE International Parallel and Distributed Processing Symposium, Hyderabad, India, May 2015, pp. 113-122, IEEE.

(Continued)

*Primary Examiner* — Benjamin H Elliot, IV
(74) *Attorney, Agent, or Firm* — Behmke Innovation Group LLC; Kenneth J. Heywood; James J. Wong (57) ABSTRACT

In one embodiment, a supervisory device for a software defined networking (SDN) fabric obtains telemetry data regarding congestion levels on a plurality of links in the SDN fabric. The supervisory device predicts seasonal congestion on a particular one of the plurality of links by using the telemetry data as input to a machine learning-based model. The supervisory device identifies a period of time associated with the predicted seasonal congestion on the particular link. The supervisory device initiates, in advance of the identified period of time, re-computation of equal-cost multi-path (ECMP) weights associated with the plurality of links that prevent occurrence of the predicted seasonal congestion on the particular link during the identified period of time.

20 Claims, 7 Drawing Sheets

(56) References Cited

U.S. PATENT DOCUMENTS

| | | | | |
|---|---|---|---|---|
| 2015/0271707 | A1* | 9/2015 | Nguyen | H04L 45/28 370/237 |
| 2016/0149816 | A1* | 5/2016 | Wu | H04L 45/245 370/235 |
| 2016/0191194 | A1* | 6/2016 | Wood | H04J 14/0286 398/58 |
| 2016/0301579 | A1* | 10/2016 | Djukic | H04L 41/5009 |
| 2017/0126475 | A1* | 5/2017 | Mahkonen | H04L 43/04 |
| 2017/0279837 | A1* | 9/2017 | Dasgupta | H04L 45/00 |
| 2019/0140937 | A1* | 5/2019 | Kumar | H04L 45/127 |

OTHER PUBLICATIONS

Chen, et al., "AuTO: Scaling Deep Reinforcement Learning for Datacenter-Scale Automatic Traffic Optimization", SIGCOMM '18 Proceedings of the 2018 Conference of the ACM Special Interest Group on Data Communication, Budapest, Hungary, Aug. 2018, pp. 191-205, ACM, New York.

"ECMP Load Balancing", MPLS: Layer 3 VPNs Configuration Guide, Cisco IOS XI Release 3S (Cisco ASR 900 Series), Jan. 2018, 12 pages, Cisco.

Guo, et al., "RDMA Over Commodity Ethernet at Scale", SIGCOMM '16 Proceedings of the 2016 ACM SIGCOMM Conference, Florianopolis, Brazil, Aug. 2016, pp. 202-215, IEEE, ACM, New York.

Husseman, Trevor, "A Beginner's Guide to Understanding the Leaf-Spine Network Topology", https://blog.westmonroepartners.com/a-beginners-guide-to-understanding-the-leaf-spine-network-topology/, Mar. 2015, 18 pages, WestMonroe.

Leiserson, Charles E., "Fat-Trees: Universal Networks for Hardware-Efficient Supercomputing", IEEE Transactions on Computers ( vol. C-34 , Issue: 10 , Oct. 1985 ), pp. 892-901, IEEE.

Salman, et al., "DeepConf: Automating Data Center Network Topologies Management with Machine Learning", NetAI'18 Proceedings of the 2018 Workshop on Network Meets AI & ML, Budapest, Hungary, Aug. 2018, pp. 8-14, ACM, New York.

"Software-Defined Networking", Online: https://en.wikipedia.org/wiki/Software-defined_Networking, Jan. 7, 2019, 11 pages, Wikimedia Foundation, Inc.

Yuan, Xin, "On Nonblocking Folded-Clos Networks in Computer Communication Environments", 2011 IEEE International Parallel & Distributed Processing Symposium, May 2011, pp. 188-196, IEEE, Anchorage, Alaska.

* cited by examiner

DETECTING SEASONAL CONGESTION IN SDN NETWORK FABRICS USING MACHINE LEARNING

TECHNICAL FIELD

The present disclosure relates generally to computer networks, and, more particularly, to detecting seasonal congestion in software defined networking (SDN) network fabrics using machine learning.

BACKGROUND

Software defined networking (SDN) represents an evolution of computer networks away from a decentralized architecture to one of centralized, software-based control. More specifically, in traditional computer networks, the control plane (e.g., selection of the routing path) and the data plane (e.g., forwarding packets along the selected path) are intertwined, with control plane decisions being made in a decentralized manner via signaling between the networking devices. In contrast, control plane decisions in an SDN-based network architecture are made by a centralized controller and pushed to the networking devices, as needed.

While applicable to any number of different types of network deployments, SDN is particularly of relevance to cloud service provider networks. Indeed, in a traditional client-server architecture, the network need only support traffic between the client and the server. However, with cloud computing, each transaction with a client may result in a large amount of "east-west" traffic between nodes in the cloud (e.g., to perform a query or computation in parallel, etc.), as well as the traditional "north-south" traffic between the cloud and the client. In addition, the very nature of cloud computing environments allows for the rapid scaling of resources with demand, such as by spinning new nodes up or down. In such situations, centralized control over the control plane results in better network performance over that of decentralized control. However, despite the overall benefits of SDN, network congestion is still an issue, in many cases.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

According to one or more embodiments of the disclosure, a supervisory device for a software defined networking (SDN) fabric obtains telemetry data regarding congestion levels on a plurality of links in the SDN fabric. The supervisory device predicts seasonal congestion on a particular one of the plurality of links by using the telemetry data as input to a machine learning-based model. The supervisory device identifies a period of time associated with the predicted seasonal congestion on the particular link. The supervisory device initiates, in advance of the identified period of time, re-computation of equal-cost multi-path (ECMP) weights associated with the plurality of links that prevent occurrence of the predicted seasonal congestion on the particular link during the identified period of time.

DESCRIPTION

A computer network is a geographically distributed collection of nodes interconnected by communication links and segments for transporting data between end nodes, such as personal computers and workstations, or other devices, such as sensors, etc. Many types of networks are available, with the types ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), or synchronous digital hierarchy (SDH) links, or Powerline Communications (PLC) such as IEEE 61334, IEEE P1901.2, and others. The Internet is an example of a WAN that connects disparate networks throughout the world, providing global communication between nodes on various networks. The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may further be interconnected by an intermediate network node, such as a router, to extend the effective "size" of each network.

Smart object networks, such as sensor networks, in particular, are a specific type of network having spatially distributed autonomous devices such as sensors, actuators, etc., that cooperatively monitor physical or environmental conditions at different locations, such as, e.g., energy/power consumption, resource consumption (e.g., water/gas/etc. for advanced metering infrastructure or "AMI" applications) temperature, pressure, vibration, sound, radiation, motion, pollutants, etc. Other types of smart objects include actuators, e.g., responsible for turning on/off an engine or perform any other actions. Sensor networks, a type of smart object network, are typically shared-media networks, such as wireless networks. That is, in addition to one or more sensors, each sensor device (node) in a sensor network may generally be equipped with a radio transceiver or other communication port, a microcontroller, and an energy source, such as a battery. Often, smart object networks are considered field area networks (FANs), neighborhood area networks (NANs), personal area networks (PANs), etc. Generally, size and cost constraints on smart object nodes (e.g., sensors) result in corresponding constraints on resources such as energy, memory, computational speed and bandwidth.

Figure 1A:
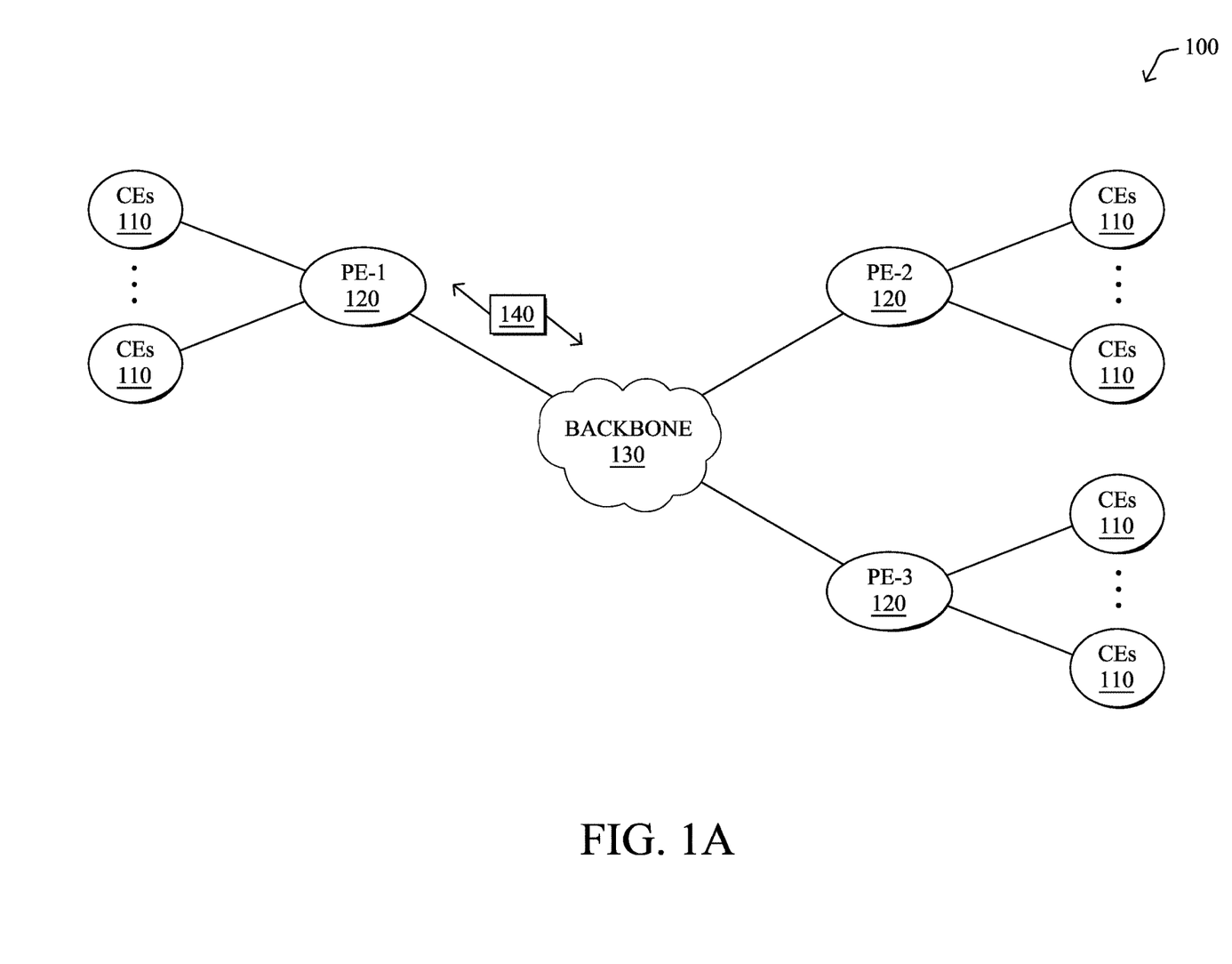
FIGS. 1A-1B illustrate an example communication network.

FIG. 1A is a schematic block diagram of an example computer network 100 illustratively comprising nodes/devices, such as a plurality of routers/devices interconnected by links or networks, as shown. For example, customer edge (CE) routers 110 may be interconnected with provider edge (PE) routers 120 (e.g., PE-1, PE-2, and PE-3) in order to communicate across a core network, such as an illustrative network backbone 130. For example, routers 110, 120 may be interconnected by the public Internet, a multiprotocol label switching (MPLS) virtual private network (VPN), or the like. Data packets 140 (e.g., traffic/messages) may be exchanged among the nodes/devices of the computer network 100 over links using predefined network communication protocols such as the Transmission Control Protocol/Internet Protocol (TCP/IP), User Datagram Protocol (UDP), Asynchronous Transfer Mode (ATM) protocol, Frame Relay protocol, or any other suitable protocol. Those skilled in the art will understand that any number of nodes, devices, links, etc. may be used in the computer network, and that the view shown herein is for simplicity.

In some implementations, a router or a set of routers may be connected to a private network (e.g., dedicated leased lines, an optical network, etc.) or a virtual private network (VPN), such as an MPLS VPN, thanks to a carrier network, via one or more links exhibiting very different network and service level agreement characteristics. For the sake of illustration, a given customer site may fall under any of the following categories:

1.) Site Type A: a site connected to the network (e.g., via a private or VPN link) using a single CE router and a single link, with potentially a backup link (e.g., a 3G/4G/LTE backup connection). For example, a particular CE router 110 shown in network 100 may support a given customer site, potentially also with a backup link, such as a wireless connection.

2.) Site Type B: a site connected to the network using two MPLS VPN links (e.g., from different service providers), with potentially a backup link (e.g., a 3G/4G/LTE connection). A site of type B may itself be of different types:

2a.) Site Type B1: a site connected to the network using two MPLS VPN links (e.g., from different service providers), with potentially a backup link (e.g., a 3G/4G/LTE connection).

2b.) Site Type B2: a site connected to the network using one MPLS VPN link and one link connected to the public Internet, with potentially a backup link (e.g., a 3G/4G/LTE connection). For example, a particular customer site may be connected to network 100 via PE-3 and via a separate Internet connection, potentially also with a wireless backup link.

2c.) Site Type B3: a site connected to the network using two links connected to the public Internet, with potentially a backup link (e.g., a 3G/4G/LTE connection).

Notably, MPLS VPN links are usually tied to a committed service level agreement, whereas Internet links may either have no service level agreement at all or a loose service level agreement (e.g., a "Gold Package" Internet service connection that guarantees a certain level of performance to a customer site).

3.) Site Type C: a site of type B (e.g., types B1, B2 or B3) but with more than one CE router (e.g., a first CE router connected to one link while a second CE router is connected to the other link), and potentially a backup link (e.g., a wireless 3G/4G/LTE backup link). For example, a particular customer site may include a first CE router 110 connected to PE-2 and a second CE router 110 connected to PE-3.

Figure 1B:
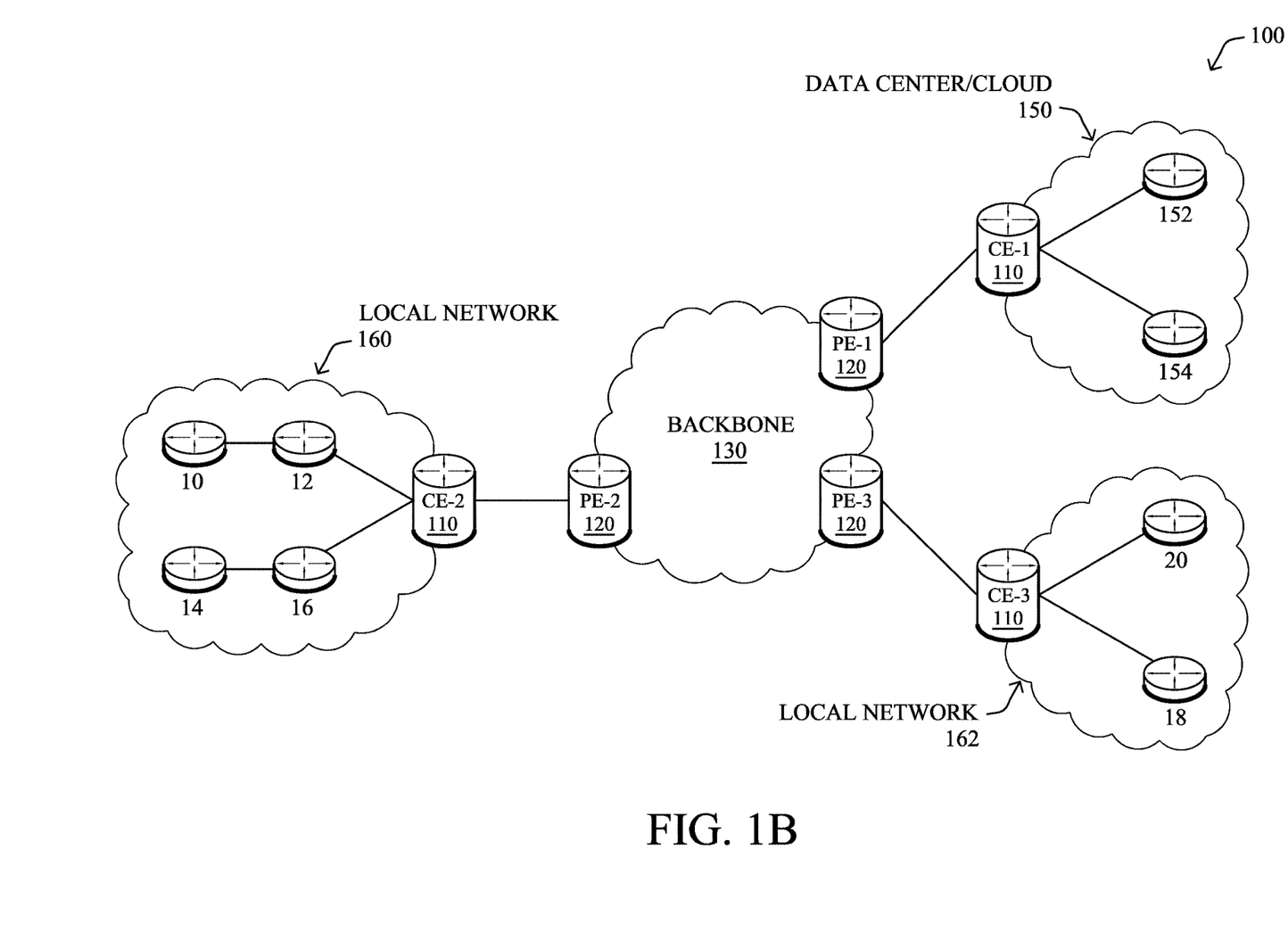

FIG. 1B illustrates an example of network 100 in greater detail, according to various embodiments. As shown, network backbone 130 may provide connectivity between devices located in different geographical areas and/or different types of local networks. For example, network 100 may comprise local networks 160, 162 that include devices/nodes 10-16 and devices/nodes 18-20, respectively, as well as a data center/cloud environment 150 that includes servers 152-154. Notably, local networks 160-162 and data center/cloud environment 150 may be located in different geographic locations.

Servers 152-154 may include, in various embodiments, a network management server (NMS), a dynamic host configuration protocol (DHCP) server, a constrained application protocol (CoAP) server, an outage management system (OMS), an application policy infrastructure controller (APIC), an application server, etc. As would be appreciated, network 100 may include any number of local networks, data centers, cloud environments, devices/nodes, servers, etc.

The techniques herein may also be applied to other network topologies and configurations. For example, the techniques herein may be applied to peering points with high-speed links, data centers, etc. Further, in various embodiments, network 100 may include one or more mesh networks, such as an Internet of Things network. Loosely, the term "Internet of Things" or "IoT" refers to uniquely identifiable objects/things and their virtual representations in a network-based architecture. In particular, the next frontier in the evolution of the Internet is the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network.

Notably, shared-media mesh networks, such as wireless networks, etc., are often on what is referred to as Low-Power and Lossy Networks (LLNs), which are a class of network in which both the routers and their interconnect are constrained. In particular, LLN routers typically operate with highly constrained resources, e.g., processing power, memory, and/or energy (battery), and their interconnections are characterized by, illustratively, high loss rates, low data rates, and/or instability. LLNs are comprised of anything from a few dozen to thousands or even millions of LLN routers, and support point-to-point traffic (e.g., between devices inside the LLN), point-to-multipoint traffic (e.g., from a central control point such at the root node to a subset of devices inside the LLN), and multipoint-to-point traffic (e.g., from devices inside the LLN towards a central control point). Often, an IoT network is implemented with an LLN-like architecture. For example, as shown, local network 160 may be an LLN in which CE-2 operates as a root node for nodes/devices 10-16 in the local mesh, in some embodiments.

Figure 2:
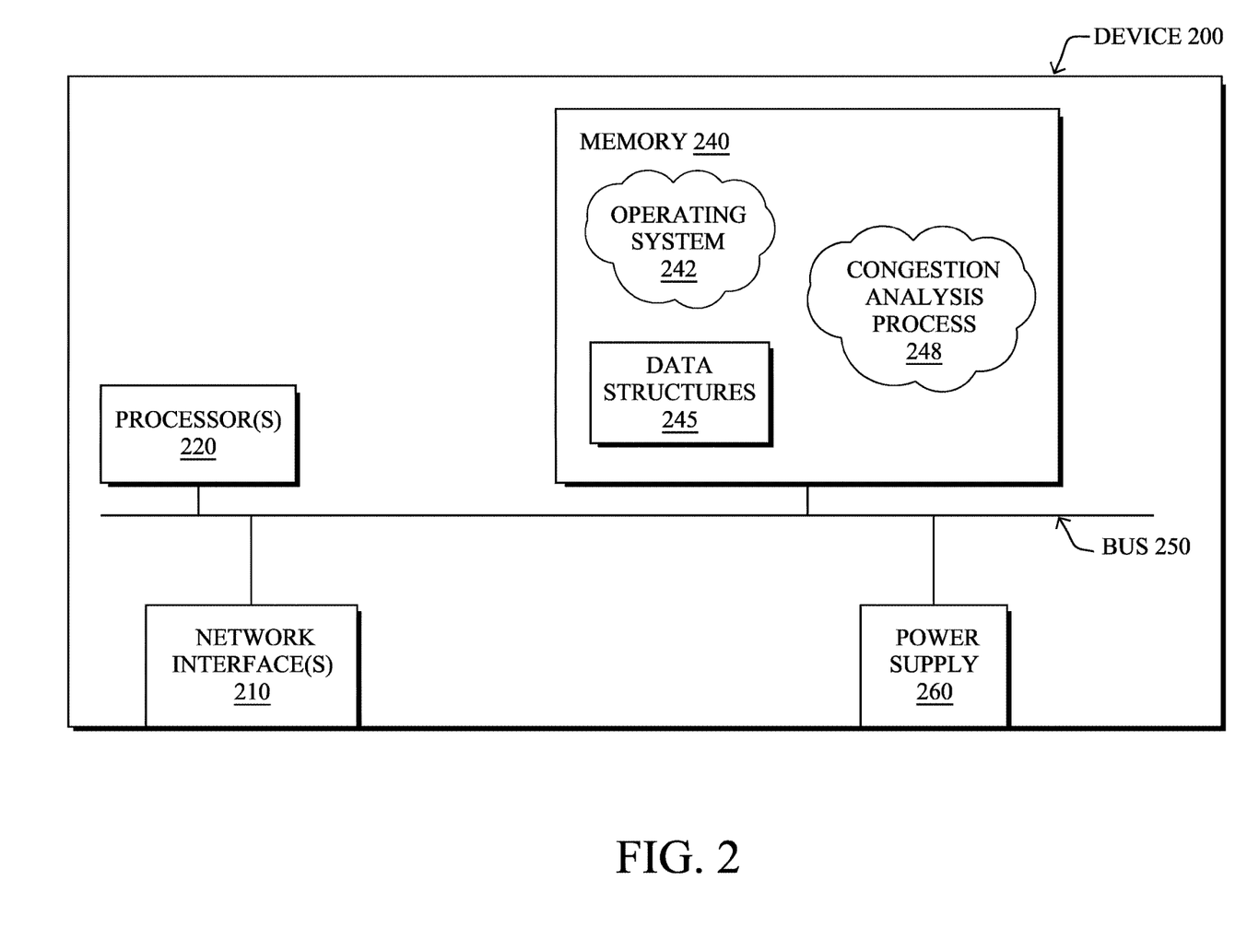
FIG. 2 illustrates an example network device/node.

FIG. 2 is a schematic block diagram of an example node/device 200 that may be used with one or more embodiments described herein, e.g., as any of the computing devices shown in FIGS. 1A-1B, particularly the PE routers 120, CE routers 110, nodes/device 10-20, servers 152-154 (e.g., a network controller located in a data center, etc.), any other computing device that supports the operations of network 100 (e.g., switches, etc.), or any of the other devices referenced below. The device 200 may also be any other suitable type of device depending upon the type of network architecture in place, such as IoT nodes, etc. Device 200 comprises one or more network interfaces 210, one or more processors 220, and a memory 240 interconnected by a system bus 250, and is powered by a power supply 260.

The network interfaces 210 include the mechanical, electrical, and signaling circuitry for communicating data over physical links coupled to the network 100. The network interfaces may be configured to transmit and/or receive data using a variety of different communication protocols. Notably, a physical network interface 210 may also be used to implement one or more virtual network interfaces, such as for virtual private network (VPN) access, known to those skilled in the art.

The memory 240 comprises a plurality of storage locations that are addressable by the processor(s) 220 and the network interfaces 210 for storing software programs and data structures associated with the embodiments described herein. The processor 220 may comprise necessary elements or logic adapted to execute the software programs and manipulate the data structures 245. An operating system 242 (e.g., the Internetworking Operating System, or IOS®, of Cisco Systems, Inc., another operating system, etc.), portions of which are typically resident in memory 240 and executed by the processor(s), functionally organizes the node by, inter alia, invoking network operations in support of software processors and/or services executing on the device. These software processors and/or services may comprise a congestion analysis process 248.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while processes may be shown and/or described separately, those skilled in the art will appreciate that processes may be routines or modules within other processes.

In general, congestion analysis process 248 may execute one or more machine learning-based models to predict traffic congestion in a network and, based on the predictions, initiate corrective measures when there is likely to be congestion. Congestion analysis process 248 may employ any number of machine learning techniques, to classify the gathered telemetry data. In general, machine learning is concerned with the design and the development of techniques that receive empirical data as input (e.g., telemetry data regarding traffic in the network) and recognize complex patterns in the input data. For example, some machine learning techniques use an underlying model M, whose parameters are optimized for minimizing the cost function associated to M, given the input data. For instance, in the context of classification, the model M may be a straight line that separates the data into two classes (e.g., labels) such that $M=a*x+b*y+c$ and the cost function is a function of the number of misclassified points. The learning process then operates by adjusting the parameters a,b,c such that the number of misclassified points is minimal. After this optimization/learning phase, congestion analysis process 248 can use the model M to classify new data points, such as information regarding new traffic flows in the network. Often, M is a statistical model, and the cost function is inversely proportional to the likelihood of M, given the input data.

In various embodiments, congestion analysis process 248 may employ one or more supervised, unsupervised, or semi-supervised machine learning models. Generally, supervised learning entails the use of a training set of data, as noted above, that is used to train the model to apply labels to the input data. For example, the training data may include sample telemetry data that is labeled as "normal," or "congestion-related." On the other end of the spectrum are unsupervised techniques that do not require a training set of labels. Notably, while a supervised learning model may look for previously seen patterns that have been labeled as such, an unsupervised model may instead look to whether there are changes in the behavior of the network traffic over time. Semi-supervised learning models take a middle ground approach that uses a greatly reduced set of labeled training data.

Example machine learning techniques that congestion analysis process 248 can employ may include, but are not limited to, nearest neighbor (NN) techniques (e.g., k-NN models, replicator NN models, etc.), statistical techniques (e.g., Bayesian networks, etc.), clustering techniques (e.g., k-means, mean-shift, etc.), neural networks (e.g., reservoir networks, artificial neural networks, etc.), support vector machines (SVMs), logistic or other regression, Markov models or chains, principal component analysis (PCA) (e.g., for linear models), multi-layer perceptron (MLP) ANNs (e.g., for non-linear models), replicating reservoir networks (e.g., for non-linear models, typically for time series), random forest classification, or the like.

The performance of a machine learning model can be evaluated in a number of ways based on the number of true positives, false positives, true negatives, and/or false negatives of the model. For example, the false positives of the model may refer to the number of times the model incorrectly predicted there to be congestion. Conversely, the false negatives of the model may refer to the number of times the model incorrectly predicted normal operation of the network, when congestion actually resulted. True negatives and positives may refer to the number of times the model correctly predicted either normal behavior or congestion, respectively. Related to these measurements are the concepts of recall and precision. Generally, recall refers to the ratio of true positives to the sum of true positives and false negatives, which quantifies the sensitivity of the model. Similarly, precision refers to the ratio of true positives the sum of true and false positives.

As noted above, software defined networking (SDN) represents an evolution of computer networks that centralizes control plane decisions with a supervisory device. For example, in Application Centric Infrastructure (ACI), an SDN-based architecture from Cisco Systems, Inc., control plane decisions may be made by a centralized APIC. However, even with centralized control, there still exists the potential for seasonal congestion to occur on certain links in the network fabric.

In general, an SDN-based network fabric may utilize a leaf-spine architecture, such as CLOS and Fat-Tree architectures. This is particularly true in the case of data center and cloud networks that are poised to deliver the majority of computation and storage services in the future. In a Fat-Tree, nodes are organized in a tree structure with branches becoming 'fatter' towards the top of the hierarchy. In the context of computer networks, this increasing 'fatness' typically corresponds to increasing bandwidth towards the top of the hierarchy. CLOS networks typically involve multiple stages (e.g., an ingress stage, a middle stage, and an egress stage), with 'crossbar' switches at different stages that are interwoven such that multiple paths are available for switching, so that one traffic flow does not block another.

As would be appreciated, an SDN network that implements a leaf-spine architecture may operate by emulating a very large switch by interleaving many smaller switches, resulting in much lower cost and higher scalability. The benefits of such designs include, but are not limited to, the availability of an equal cost multi-path (ECMP) based switching fabric, a simplified network, and fully utilized link bandwidth on each network node. It also allows the networks to scale and grow incrementally, on demand. Cisco's next generation SDN based data center network fabric architecture, ACI, is also based on CLOS design principles.

Figure 3A:
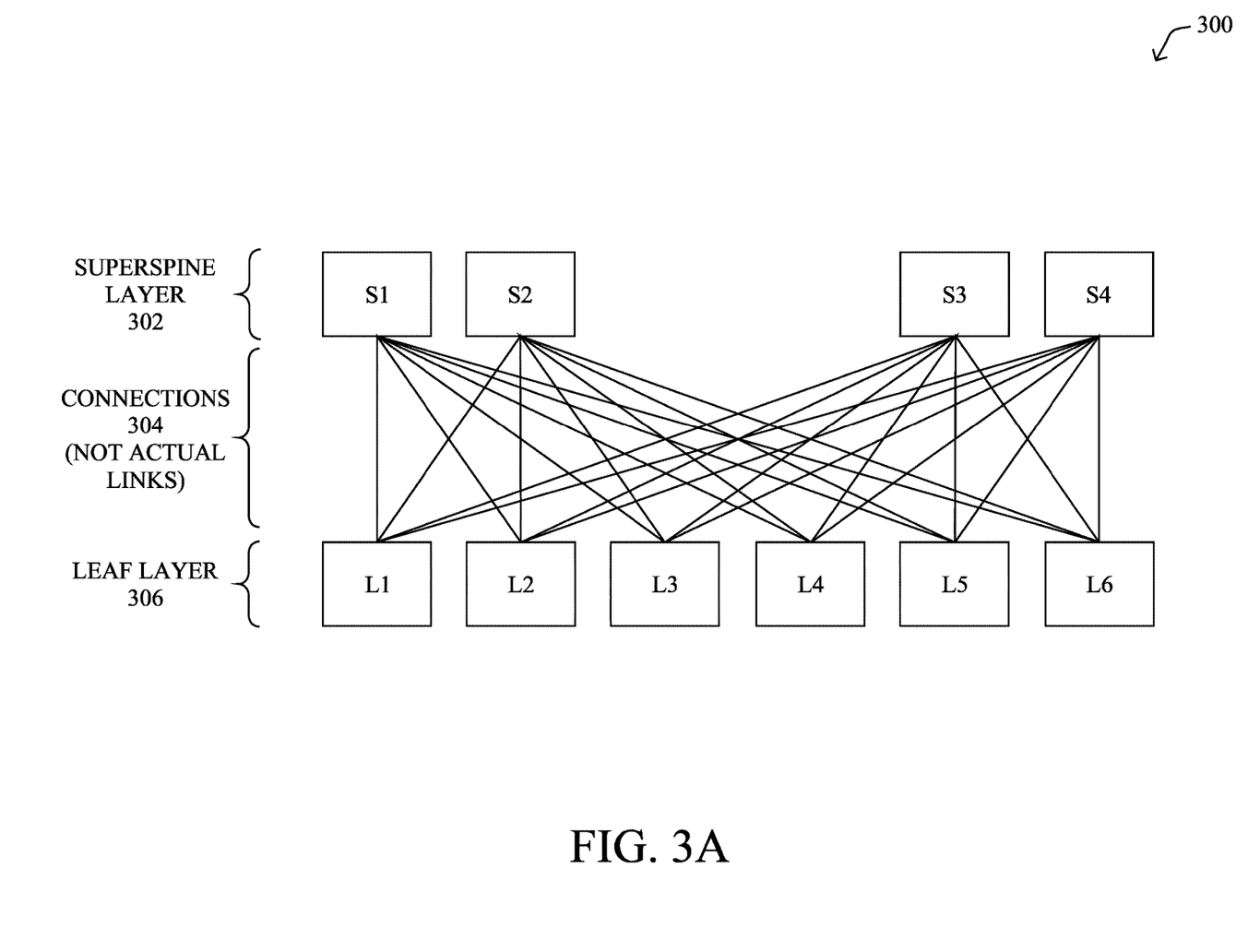
FIGS. 3A-3B illustrate examples of software defined networking (SDN) network implementations.

FIG. 3A illustrates a simplified example of an SDN network 300 that uses a leaf-spine architecture. As shown, the network switches S1-S4 and L1-L6 may be organized according to CLOS design principles. In particular, switches S1-S4 may form a superspine 302. This layer is also sometimes called the Top of Fabric (ToF) layer, such as in RIFT. At the south of network 300 is a leaf layer 306 that comprises switches L1-L6 and provide connectivity to the various clients of network 300, such as endpoints or virtual machines (VMs), and implement Layer 2 bridging and Layer 3 routing functions. Likewise, S1-S4 in superspine layer 302 may be fully meshed with L1-L6 in leaf layer 306 via connections 304, which are not actual links, in the physical sense. During operation, S1-S4 may provide redundant paths and connectivity from a previous lower-level stage switch in the network fabric.

Figure 3B:
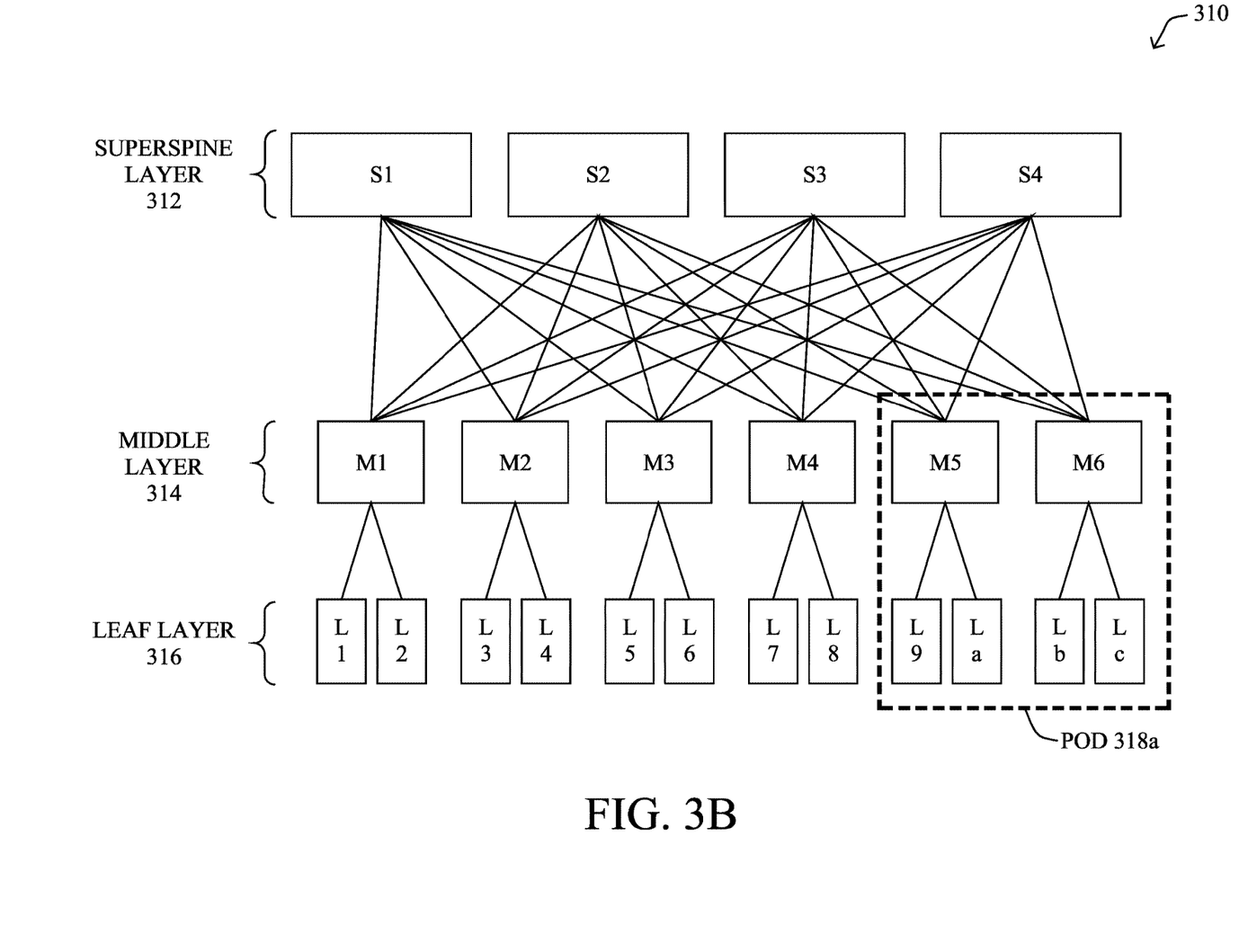

FIG. 3B illustrates another example SDN network 310 that uses a CLOS-based approach. As shown, at the top of network 310 are switches S1-S4 that form a superspine layer 312 that are connected to a middle layer 314 comprising switches M1-M6 which are, in turn, connected to a leaf layer 316 comprising switches L1-Lc. The overall function of network 310 may be similar to that of network 300 in FIG. 3A, with the addition of middle layer 314 that may perform, for example, aggregation functions. Leaf switches and their corresponding switches in middle layer 314 may also form pods, such as pod 318a shown.

Today, a large, virtualized data center fabric might be comprised of approximately 500-1000 leaf switches and as many as approximately 8-16 spine switches servicing many of its tenant's virtual networks on the shared, physical network infrastructure. Each leaf switch, in turn, may be connected to between 32-98 physical hypervisor servers, with each server hosting approximately 20 virtual servers/endpoints that estimate to between 1000-2000 endpoints connected per leaf switch. In such a shared network deployment, network access security becomes an important factor for consideration.

More specifically, in virtualized data center deployments, like ACI, the movement of endpoints from one leaf port to another, or from one endpoint group (typically tied to the dot1q VLAN the vSwitch tags to outgoing packets) to another within the same leaf or across leaf switches of the network fabric, is very common. In such loosely-coupled network connectivity models, where the locality of the endpoints is not fixed, the network fabric and the endpoints become vulnerable to attacks by the rogue devices. For example, if the initial network access or the subsequent endpoint moves are allowed without any verification, it might lead to severe security issues. This enforces an important requirement on the underlying first hop switches that are responsible for network connectivity: to grant network access only to authorized endpoints and deny connectivity to unauthorized devices.

Typically, the SDN network fabric heavily relies on ECMP load balancing to be as non-blocking as possible. In other words, ECMP is typically used to avoid the saturation of any single router in the fabric due to flows converging from many ports into one. Even with a well-implemented ECMP approach, there are still statistical changes of this congestion situation occurring. In such cases of congestion, the standard approach is to employ a reactive technique (e.g., DCQCF, PFC, TIMELY, etc.). However, regardless of the reactive technique used, each yields its own problems in terms of detecting congestion, reaction times, and the impact of the congestion spreading to other flows.

Detecting Seasonal Congestion in SDN Network Fabrics Using Machine Learning

The techniques herein introduce a proactive approach to handling congestion in an SDN network fabric. In some aspects, learning machine may be used to assess the risk of congestion, also sometimes known as blocking or incast, and predict these conditions before they occur. In turn, the techniques herein may adaptively perform load balancing (e.g., via ECMP weight re-calculations) to slightly route around the potential problem. For example, some flows can be re-seeded in hash-based ECMP, until the learning machine decide the conditions are restored for normal behavior.

Specifically, a supervisory device for a software defined networking (SDN) fabric obtains telemetry data regarding congestion levels on a plurality of links in the SDN fabric. The supervisory device predicts seasonal congestion on a particular one of the plurality of links by using the telemetry data as input to a machine learning-based model. The supervisory device identifies a period of time associated with the predicted seasonal congestion on the particular link. The supervisory device initiates, in advance of the identified period of time, re-computation of equal-cost multi-path (ECMP) weights associated with the plurality of links that prevent occurrence of the predicted seasonal congestion on the particular link during the identified period of time.

Illustratively, the techniques described herein may be performed by hardware, software, and/or firmware, such as in accordance with the congestion analysis process 248 which may include computer executable instructions executed by the processor 220 (or independent processor of interfaces 210) to perform functions relating to the techniques described herein.

Operationally, as noted above, many SDN network topologies are designed to be simple, making heavy use of ECMP to help load balance traffic flows. This contrasts with WAN networks (private and SP) where sophisticated strategies are used to perform traffic engineering, thus allowing for directing the traffic so as to adjust the traffic demand to the available resources in the network. Typical technologies used for such deployments make use of off-line computations of Interior Gateway Protocol (IGP) metrics, off-line or on-line traffic steering on MPLS Traffic Engineering label switched paths (LSPs), or the like.

According to various embodiments, a supervisory device for an SDN network fabric (e.g., an APIC, etc.) may make use of one or more machine learning-based models, to predict seasonal link congestion in the fabric. The rationale for detecting seasonal congestion is to apply remediation action(s), detailed below, to links where congestion is sustained or seasonal, thus preserving the main objective of minimizing the ECMP fine tuning load.

To that end, the supervisory device for the SDN network fabric may obtain telemetry data regarding the level of any, or all, of the links in the fabric. For example, each leaf in the fabric may report its gathered telemetry data for its links to the supervisory device for further analysis. In one embodiment, the telemetry data may indicate the average load measured on the link, ether globally or per-class, over a period of time P. In another embodiment, the telemetry data may report the median value, or N-Percentile (N=80, 90) of link load or other metrics, such as the queue length, to the supervisory device. Notably, queue length is a good predictive metric of the quality of service (QoS) experienced by the traffic on the link. For each of these metrics, the N-Percentile of minimum, average, and/or maximum may be reported to the supervisory device.

The captured telemetry data may be reported to the supervisory device at any time and on a push or pull basis. In some cases, link congestion may be reported based on the occurrence of congestion on the links. For example, a congestion event may be reported to the supervisory device in the form of an an event matrix, each time the reported value exceeds a given threshold T. Such a matrix may report the number of times a link L is in a congested state, where the level of congestion is specified as T (e.g., T could be a queue length in terms of number of packets queued considering the link bandwidth, percentage of load on the link, etc.).

The machine learning model(s) of the supervisory device may also be of various forms, as desired. For example, the model may make use of auto-correlation computations. In another embodiment, the model may comprise a regression model that uses the telemetry data as input features in a time-based manner (e.g., by time of day, day of the week, etc.). In turn, the device may use a technique such as Centered Individual Conditional Expectation (c-ICE) or SHapley Additive exPlanations (SHAPE) value, to assess the feature importance and determine whether the congestion is indeed seasonal.

In various embodiments, another key component of the techniques herein is the initiation of a corrective measure, when the machine learning-based model(s) predict seasonal congestion on a link in the network fabric. If, for example, the model flags a link $L_i$ as 'congested' according to seasonal patterns, or for at least a significant period of time, the supervisory device may initiate re-computation of the ECMP operation, with the objective of releasing the period of times during which the link is congested and without resulting in congestion on other links. Said differently, the supervisory device may trigger a global ECMP traffic engineering function to globally optimize the fabric and avoid the predicted link congestion. The ability to detect highly seasonal link congestion using machine learning makes this global traffic engineering sustainable.

If the re-computation of the ECMP weights by the supervisory device can be used without any negative effects, the supervisory device may use the re-computed ECMP weights to adjust the network, accordingly. However, it may also be the case that the supervisory device cannot compute new weights without causing at least slight congestion elsewhere. In one embodiment, if the supervisory device cannot compute ECMP weights that would fully avoid congestion, the device may employ a time-based ECMP approach that use the re-computed ECMP weights only during the time period associated with the predicted congestion. Such an approach may be generalized so as to make use of a time-based matrix of ECMP weights used to avoid high seasonal link congestion in the fabric. It is also worth pointing out that what makes such an approach viable is the ability to reliably detect seasonality, in contrast with existing techniques where congestion is released on-the-fly (i.e., upon detection of congestion).

In yet another embodiment, it may be the case that a set of one or more links L experience seasonal congestion because of a few seasonal fat flows. Such a situation is fairly common, in practice, and could be due to seasonal fat flows routed onto the fabric (e.g., a large traffic backup). In such a case, in contrast with the previous approach, the supervisory device may schedule time-based rerouting on the fabric, on-the-fly. In this embodiment, the supervisory device may compute an alternate local tunnel aimed at carrying the offending/seasonal traffic off of the congested link and along some alternate path. To detect these flows, the telemetry data assessed by the supervisory device may include traffic information, such as packet captures from the traffic, to identify the seasonal flows. Once identified, the supervisory device may push a time-based rerouting schedule onto the upstream node from where the offending traffic should be rerouted, indicating the duration of time of the reroute and the alternate path that should be used. The technique used for traffic reroute could be based on temporary EMCP weights adjustment or, preferably, the use of tunnels (e.g., IPSec, TE LSP, etc.). In contrast with the previous approach where offending traffic is not necessarily identified, seasonality of the traffic could be identified through DPI, should the traffic be unencrypted, and applying a machine learning model to the captured traffic information (e.g., the source, destination, timing, associated application, etc.).

As would be appreciated, in contrast with existing traffic engineering where traffic is off-loaded/rerouted based on off-line traffic engineering using traffic matrices or on-line (reactive), the techniques introduced herein are time-based according to discovered seasonality, proactive, and local.

In yet another embodiment, if the supervisory device cannot find a local alternate path or a new new set of ECMP weights for rerouting the traffic, the device may perform a routing lookup to identify the node attached to the source of the offending traffic so as to activate a time-based Call Admission Control (CAC) for the seasonal duration of the congestion. This embodiment allows for activating CAC for seasonal traffic identified by a machine learning-based traffic model, as described before.

In a further embodiment, the node rejecting the offending traffic may downgrade the flow (e.g., by rewriting the DSCP) to a lower Class of Service (CoS), if the node can determine that the congestion only occurs for a (higher) CoS, in which case the offending may be admitted along the same old path but with a less-preferred CoS. Note that such a CoS downgrade may alternatively be performed on the node immediately upstream to the link experiencing a seasonal CoS-based congestion.

Figure 4:
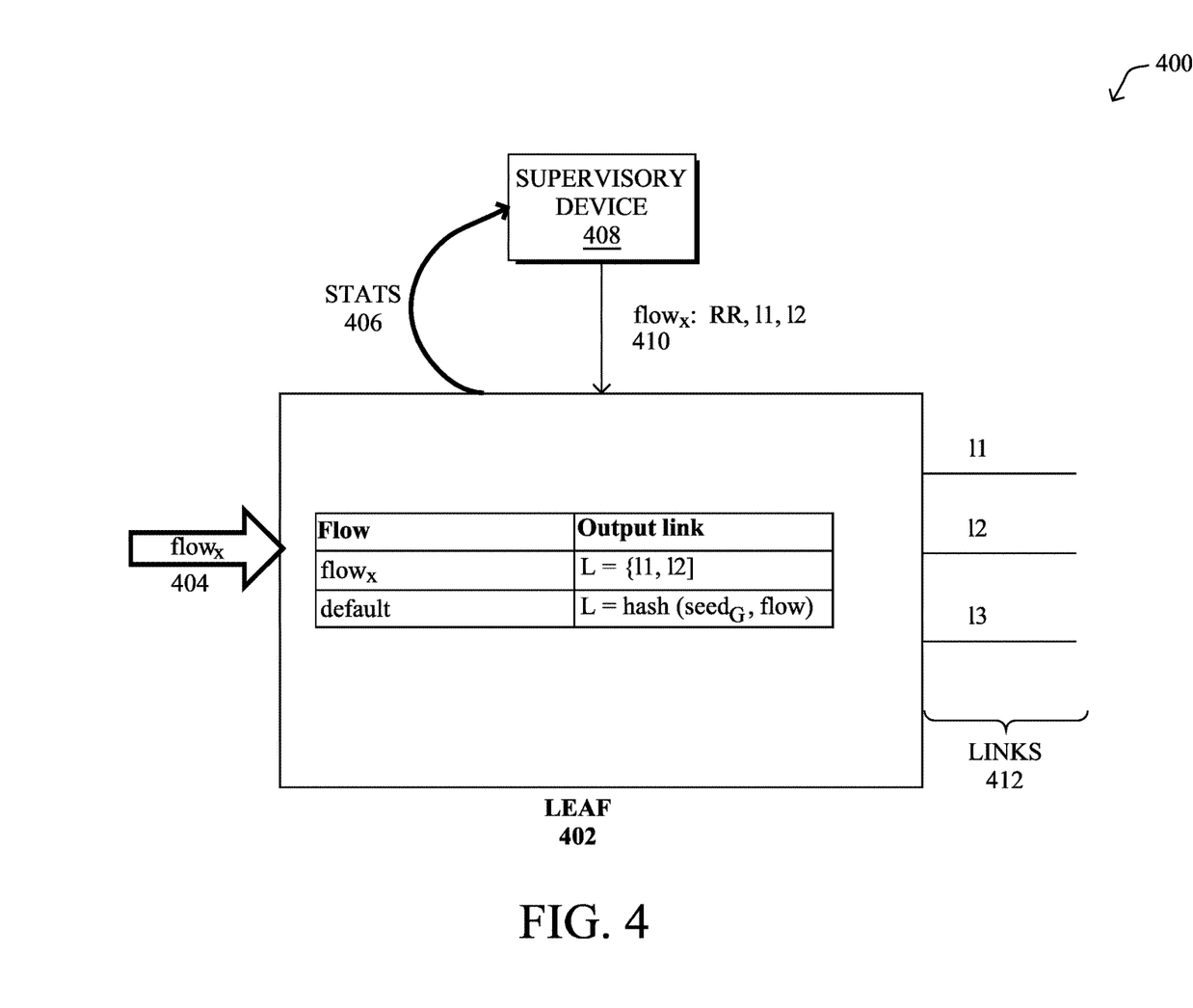
FIG. 4 illustrates an example architecture for assessing congestion in an SDN fabric.

FIG. 4 illustrates an example architecture for assessing congestion in an SDN fabric 400, in accordance with the techniques herein. As shown, assume that a leaf 402 in fabric 400 has three links 412: 11, 12, and 13. The default behavior of leaf 402 is to apply a hash function, based on a seed (seedG) plus source/destination, to determine which link 412 to use to forward an incoming traffic flow.

During operation, leaf 402 may report statistics 406 to supervisory device 408 regarding link congestion of links 412 and/or flow-level telemetry, such as information regarding a particular incoming flow 404, $flow_x$. Based on the reported statistics 406, supervisory device 408 may predict that a particular link 412 will experience congestion during a particular period of time, and potentially due to a seasonal traffic flow, such as $flow_x$. To avoid this predicted congestion, supervisory device may send an instruction 410 to leaf 402 that causes the offending flow to be sent over a particular set of links (e.g., 11 and 12) in a round robin fashion.

One leaf 402 has been programmed via instruction 410, when leaf 402 receives a new flow 404, it may determine whether the incoming flow 404 matches an exception indicated in instruction 410. For example, leaf 402 may forward flows matching flowx either on link 11 or on link 12, in accordance with instruction 410. Other flows 410, however, may be forwarded by leaf 402 through the application of its regular hash plus seed.

Note that moving an unbalanced flow around the links and spine will not rebalance the fabric itself. If some flows are identified for causing an unbalance/congestion, a per-flow seed may be used. Such a seed may, for instance, be applied to every packet to send each packet on a different link, in a round robin manner. The per-flow seed could also be used to white list of black list a set of links which, according the machine learning outcome, is expected to re-balance the fabric.

Figure 5:
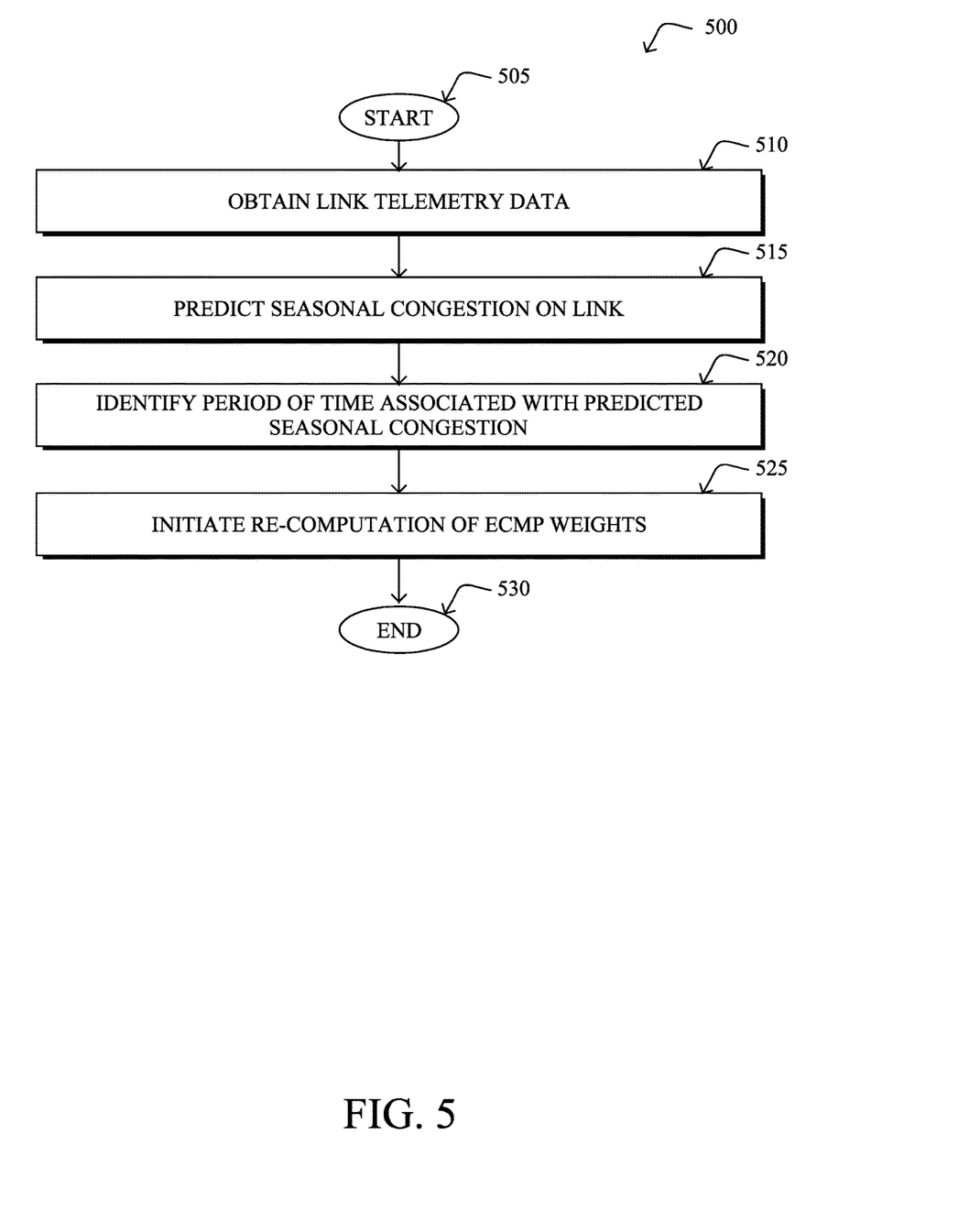
FIG. 5 illustrates an example simplified procedure for assessing congestion in an SDN fabric.

FIG. 5 illustrates an example simplified procedure for assessing congestion in an SDN fabric, in accordance with one or more embodiments described herein. For example, a non-generic, specifically configured supervisory device for the fabric (e.g., device 200) may perform procedure 500 by executing stored instructions (e.g., process 248). The procedure 500 may start at step 505, and continues to step 510, where, as described in greater detail above, the supervisory device may obtain telemetry data regarding congestion levels on a plurality of links in the SDN fabric. For example, the telemetry data may include link load or queue length measurements associated with the links. In further cases, the telemetry data may also include per-flow information, such as the source, destination, timing, etc. of the flows.

At step 515, as detailed above, the supervisory device may predict seasonal congestion on a particular one of the plurality of links by using the telemetry data as input to a machine learning-based model. Any number of different types of machine learning models may be suitable to make the predictions. For example, the model may be a regression model or use auto-correlation, to identify the seasonality of the congestion. In some embodiments, the model may further make the seasonality determination based on a Centered Individual Conditional Expectation (c-ICE) or a SHapley Additive exPlanations (SHARP) value.

At step 520, the supervisory device may identify a period of time associated with the predicted seasonal congestion on the particular link, as described in greater detail above. For example, the congestion may occur at a certain time of day, on a particular day, or the like, as indicated by the machine learning model.

At step 525, as detailed above, the supervisory device may initiate, in advance of the identified period of time, re-computation of equal-cost multi-path (ECMP) weights associated with the plurality of links that prevent occurrence of the predicted seasonal congestion on the particular link during the identified period of time. In some embodiments, if the re-computed ECMP weights would not alleviate the predicted congestion, the device may initiate a CAC on a node attached to a source of the predicted congestion. In further embodiments, the device may revert the ECMP weights back to their original weights, after the predicted congestion time period. In addition, the device may make use of a hash seed, to move one or more traffic flows that are the cause of the predicted congestion to one or more other links in the fabric. Procedure 500 then ends at step 530.

It should be noted that while certain steps within procedure 500 may be optional as described above, the steps shown in FIG. 5 are merely examples for illustration, and certain other steps may be included or excluded as desired. Further, while a particular order of the steps is shown, this ordering is merely illustrative, and any suitable arrangement of the steps may be utilized without departing from the scope of the embodiments herein.

The techniques described herein, therefore, allow for the avoidance of link congestion in an SDN network fabric through the identification of seasonal congestion. Notably, the use of machine learning allows for the fabric to self-correct in a proactive manner, as opposed to reactively.

While there have been shown and described illustrative embodiments that provide for predicting congestion in an SDN network fabric, it is to be understood that various other adaptations and modifications may be made within the spirit and scope of the embodiments herein. For example, while certain embodiments are described herein with respect to using certain models for purposes of predicting congestion, the models are not limited as such and may be used for other functions, in other embodiments. In addition, while certain protocols are shown, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
    obtaining, by a supervisory device for a software defined networking (SDN) fabric, telemetry data regarding congestion levels on a plurality of links in the SDN fabric;
    predicting, by the supervisory device, seasonal congestion on a particular one of the plurality of links by using the telemetry data as input to a machine learning-based model;
    identifying, by the supervisory device, a period of time associated with the predicted seasonal congestion on the particular link;
    in advance of the identified period of time, initiating, by the supervisory device, re-computation of equal-cost multi-path (ECMP) weights associated with the plurality of links that prevent occurrence of the predicted seasonal congestion on the particular link during the identified period of time; and
    reverting the re-computed ECMP weights to prior ECMP weights after expiration of the period of time.

2. The method as in claim 1, wherein the telemetry data comprises a link load or queue length measurement associated with one of the links.

3. The method as in claim 2, wherein obtaining the telemetry data comprises:
    receiving the telemetry data from leaves in the SDN fabric, wherein the leaves report the telemetry data to the supervisory device based on the link load or queue length measurement exceeding a predefined threshold.

4. The method as in claim 1, wherein the machine learning-based model predicts the seasonal congestion based on a Centered Individual Conditional Expectation (c-ICE) or a SHapley Additive exPlanations (SHARP) value.

5. The method as in claim 1, wherein
reverting the re-computed ECMP weights to prior ECMP weights after expiration of the period of time is in response to determining that the re-computed ECMP weights will result in increased congestion on another one of the plurality of links.

6. The method as in claim 1, further comprising:
using a hash seed to move a traffic flow from the particular link to one or more other links in the plurality during the period of time.

7. The method as in claim 1, further comprising:
determining that the re-computed ECMP weights will not alleviate the predicted congestion;
performing a routing lookup to identify a node attached to a source associated with the predicted congestion; and
initiating a call admission control on the identified node.

8. The method as in claim 1, further comprising:
using the machine learning-based model to identify one or more traffic flows as a source of the predicted congestion; and
initiating use of a tunnel to reroute the identified one or more traffic flows in the SDN fabric during the period of time.

9. An apparatus, comprising:
one or more network interfaces to communicate with a software defined networking (SDN) fabric;
a processor coupled to the network interfaces and configured to execute one or more processes; and
a memory configured to store a process executable by the processor, the process when executed configured to:
obtain telemetry data regarding congestion levels on a plurality of links in the SDN fabric;
predict seasonal congestion on a particular one of the plurality of links by using the telemetry data as input to a machine learning-based model;
identify a period of time associated with the predicted seasonal congestion on the particular link;
in advance of the identified period of time, initiate re-computation of equal-cost multi-path (ECMP) weights associated with the plurality of links that prevent occurrence of the predicted seasonal congestion on the particular link during the identified period of time; and
revert the re-computed ECMP weights to prior ECMP weights after expiration of the period of time.

10. The apparatus as in claim 9, wherein the telemetry data comprises a link load or queue length measurement associated with one of the links.

11. The apparatus as in claim 10, wherein the apparatus obtains the telemetry data by:
receiving the telemetry data from leaves in the SDN fabric, wherein the leaves report the telemetry data to the apparatus based on the link load or queue length measurement exceeding a predefined threshold.

12. The apparatus as in claim 9, wherein the machine learning-based model predicts the seasonal congestion based on a Centered Individual Conditional Expectation (c-ICE) or a SHapley Additive exPlanations (SHARP) value.

13. The apparatus as in claim 9, wherein
to revert the re-computed ECMP weights to prior ECMP weights after expiration of the period of time is in response to a determination that the re-computed ECMP weights will result in increased congestion on another one of the plurality of links.

14. The apparatus as in claim 9, wherein the process when executed is further configured to:
use a hash seed to move a traffic flow from the particular link to one or more other links in the plurality during the period of time.

15. The apparatus as in claim 9, wherein the process when executed is further configured to:
determine that the re-computed ECMP weights will not alleviate the predicted congestion;
perform a routing lookup to identify a node attached to a source associated with the predicted congestion; and
initiate a call admission control on the identified node.

16. The apparatus as in claim 9, wherein the process when executed is further configured to:
use the machine learning-based model to identify one or more traffic flows as a source of the predicted congestion; and
initiate use of a tunnel to reroute the identified one or more traffic flows in the SDN fabric during the period of time.

17. A tangible, non-transitory, computer-readable medium storing program instructions that cause a supervisory device for a software defined networking (SDN) fabric to execute a process comprising:
obtaining, by the supervisory device, telemetry data regarding congestion levels on a plurality of links in the SDN fabric;
predicting, by the supervisory device, seasonal congestion on a particular one of the plurality of links by using the telemetry data as input to a machine learning-based model;
identifying, by the supervisory device, a period of time associated with the predicted seasonal congestion on the particular link;
in advance of the identified period of time, initiating, by the supervisory device, re-computation of equal-cost multi-path (ECMP) weights associated with the plurality of links that prevent occurrence of the predicted seasonal congestion on the particular link during the identified period of time; and
reverting the re-computed ECMP weights to prior ECMP weights after expiration of the period of time.

18. The computer-readable medium as in claim 17, wherein the telemetry data comprises a link load or queue length measurement associated with one of the links.

19. The computer-readable medium as in claim 17, wherein
reverting the re-computed ECMP weights to prior ECMP weights after expiration of the period of time is in response to determining that the re-computed ECMP weights will result in increased congestion on another one of the plurality of links.

20. The computer-readable medium as in claim 17, wherein the process further comprises:
using a hash seed to move a traffic flow from the particular link to one or more other links in the plurality during the period of time.

* * * * *